United States Patent [19]
Sezume et al.

[11] Patent Number: 6,143,813
[45] Date of Patent: Nov. 7, 2000

[54] PROPYLENE RESIN COMPOSITION AND STRETCHED FILM PRODUCED THEREFROM

[75] Inventors: Tadashi Sezume; Yasunori Nakamura, both of Yokkaichi, Japan

[73] Assignee: Japan Polychem Corporation, Tokyo-To, Japan

[21] Appl. No.: 09/275,018

[22] Filed: Mar. 24, 1999

[30] Foreign Application Priority Data

Mar. 24, 1998 [JP] Japan .................................. 10-075661

[51] Int. Cl.[7] .............................. C08K 5/52; C08K 5/49; C08K 5/13
[52] U.S. Cl. .......................... 524/127; 524/108; 524/120; 524/335; 524/384; 524/437; 524/481; 524/493
[58] Field of Search ...................................... 524/108, 120, 524/127, 335, 384, 437, 481, 493

[56] References Cited

U.S. PATENT DOCUMENTS 5,153,249  10/1992  Yokote et al. ........................... 524/108
5,641,828  6/1997  Sadatoshi et al. ....................... 524/451

FOREIGN PATENT DOCUMENTS 0 280 297  8/1988  European Pat. Off. .
0 397 498  11/1990  European Pat. Off. .
0 586 109  3/1994  European Pat. Off. .

OTHER PUBLICATIONS

Derwent Publications, Ltd., Derwent Abstracts, AN 1996–136454, JP 08 027329, Jan. 30, 1996.

*Primary Examiner*—Kriellion Sanders
*Attorney, Agent, or Firm*—Oblon, Spivak, McClelland, Maier & Neustadt, P.C.

[57] ABSTRACT

Propylene resin composition containing propylene-α-olefin random copolymer, nucleating agent and spherical magnesium silicate particles. Stretched films.

6 Claims, No Drawings

PROPYLENE RESIN COMPOSITION AND STRETCHED FILM PRODUCED THEREFROM

BACKGROUND OF THE INVENTION

1. Field of the Invention

The present invention relates to a propylene resin composition and a stretched film produced therefrom. More particular, the present invention relates to a propylene resin composition that can provide a stretched film which possesses excellent transparency, gloss, and blocking resistance without sacrificing low temperature shrinkability and, in addition, exhibits excellent hot slip properties at the time of packaging and pinhole resistance at the time of shrink packaging after melt cutting and sealing, causes no significant lowering in transparency and gloss upon shrinking, and is free from separation of an anti-blocking agent at the time of formation, slitting or the like of the film.

2. Background Art

Polypropylene films have been widely used as biaxially shrinkable shrink films in packaging of containers for instant foods, such as instant noodles, packed liquors and the like. They, however, have not always satisfied requirements for properties, such as blocking resistance, scratch resistance, hot slip properties at the time of packaging, pinhole resistance at the time of shrink packaging, and transparency and gloss after shrinking.

For example, in order to prepare films possessing excellent low temperature shrinkability, a method has been proposed wherein the ethylene content of a propylene/ethylene random copolymer is increased to lower the melting peak temperature, thereby improving the low temperature shrinkability. This method, wherein the ethylene content is increased, however, suffers from problems associated with blocking resistance, scratch resistance, hot slip properties at the time of packaging (slip properties in the step of tucking a film on a tube by means of a shrink packaging machine to package a container (wherein heating with a heater for melt cutting and sealing is carried out) or slipperiness between containers which have been shrink packaged, in the step of packing in a box, after passage through a shrink tunnel), pinhole resistance at the time of shrink packaging after melt cutting and sealing, transparency after shrinking, or lowered gloss.

Even though these quality requirements could have been satisfied, problems remain unsolved such as separation of an anti-blocking agent during formation of films which causes deposition of powder of the anti-blocking agent onto a roller or occurrence of powder at the time of slitting or bag making.

Accordingly, it is an object of the present invention to provide a propylene resin composition that can provide a stretched film which possesses excellent transparency, gloss, blocking resistance, and scratch resistance without sacrificing low temperature shrinkability and, in addition, exhibits excellent hot slip properties at the time of packaging and pinhole resistance at the time of shrink packaging after melt cutting and sealing, causes no significant lowering in transparency and gloss upon shrinking, and is free from separation of an anti-blocking agent at the time of formation, slitting or the like of the film.

SUMMARY OF THE INVENTION

The present inventors have made intensive and extensive studies and, as a result, have found that the above object can be attained by incorporating a specific nucleating agent and a specific anti-blocking agent into a specific propylene resin. This has led to the completion of the present invention.

Thus, according to one aspect of the present invention, there is provided a propylene resin composition comprising: a propylene-α-olefin random copolymer composed mainly of propylene, the propylene-α-olefin random copolymer satisfying the following copolymer property requirements (1) to (4); a nucleating agent which, when added to the propylene-α-olefin random copolymer, can bring the isothermal crystallization time [B] at 115° C. of the copolymer to a value satisfying the following requirements [I] and [II]; and 0.01 to 1 part by weight, based on 100 parts by weight of the propylene-α-olefin random copolymer, of spherical magnesium silicate particles having an average particle diameter of 0.5 to 7.0 μm and a sphericity (f) of not less than 0.7:

(i) copolymer property requirements
  (1) the melt flow rate of 1.0 to 20.0 g/10 min,
  (2) the melting peak temperature of 130 to 150° C. as determined with a differential scanning calorimeter (DSC),
  (3) the extraction of not more than 4.0% by weight as extracted at 40° C. using o-dichlorobenzene as a solvent, and
  (4) the ratio of the weight average molecular weight to the number average molecular weight of 1.5 to 7.0 as determined by gel permeation chromatography (GPC); and (ii) isothermal crystallization time at 115° C.

$$50 \leq [A]-[B] \leq 500 \quad [\text{I}]$$
$$[B] \leq 100 \quad [\text{II}]$$

wherein [A] represents the isothermal crystallization time (sec) at 115° C. of the propylene-α-olefin random copolymer with the nucleating agent not added thereto as measured with DSC; and [B] represents the isothermal crystallization time (sec) at 115° C. of the propylene-α-olefin random copolymer with the nucleating agent added thereto as measured with DSC.

According to another aspect of the present invention, there is provided a stretched film produced by forming a propylene resin composition into a sheet or a film and at least monoaxially stretching the sheet or film, the propylene resin composition comprising: a propylene-α-olefin random copolymer composed mainly of propylene, the propylene-α-olefin random copolymer satisfying the following copolymer property requirements (1) to (4); a nucleating agent which, when added to the propylene-α-olefin random copolymer, can bring the isothermal crystallization time [B] at 115° C. of the copolymer to a value satisfying the following requirements [I] and [II]; and 0.01 to 1 part by weight, based on 100 parts by weight of the propylene-α-olefin random copolymer, of spherical magnesium silicate particles having an average particle diameter of 0.5 to 7.0 μm and a sphericity (f) of not less than 0.7:

(i) copolymer property requirements
  (1) the melt flow rate of 1.0 to 20.0 g/10 min,
  (2) the melting peak temperature of 130 to 150° C. as determined with a differential scanning calorimeter (DSC),
  (3) the extraction of not more than 4.0% by weight as extracted at 40° C. using o-dichlorobenzene as a solvent, and
  (4) the ratio of the weight average molecular weight to the number average molecular weight of 1.5 to 7.0 as determined by gel permeation chromatography (GPC); and (ii) isothermal crystallization time at 115° C.

$$50 \leq [A]-[B] \leq 500 \quad \text{[I]}$$

$$[B] \leq 100 \quad \text{[II]}$$

wherein [A] represents the isothermal crystallization time (sec) at 115° C. of the propylene-α-olefin random copolymer with the nucleating agent not added thereto as measured with DSC; and [B] represents the isothermal crystallization time (sec) at 115° C. of the propylene-α-olefin random copolymer with the nucleating agent added thereto as measured with DSC.

The propylene resin composition according to the present invention, by virtue of the incorporation of a specific nucleating agent and a specific anti-blocking agent into a specific propylene resin, can provide a stretched film which possesses excellent transparency, gloss, blocking resistance, and scratch resistance without sacrificing low temperature shrinkability and, in addition, exhibits excellent hot slip properties at the time of packaging and pinhole resistance at the time of shrink packaging after melt cutting and sealing, causes no significant lowering in transparency and gloss upon shrinking, and is free from separation of an anti-blocking agent at the time of formation, slitting or the like of the film. Thus, the propylene resin composition of the present invention can provide stretched films having very high practical value for shrink packaging.

DETAILED DESCRIPTION OF THE INVENTION

[I] Propylene Resin Composition (1) Components (A) Propylene-α-olefin Random Copolymer According to a preferred embodiment of the present invention, the propylene-α-olefin random copolymer, composed mainly of propylene, to be used as a main component in the propylene resin composition may be a random bipolymer comprising a main component of propylene and a minor component of an α-olefin having 2 or 4 to 20 carbon atoms, preferably 4 to 8 carbon atoms, or a random terpolymer comprising a main component of propylene and a minor component of ethylene and an α-olefin having 4 to 20 carbon atoms, preferably 4 to 8 carbon atoms. The propylene-α-olefin random copolymer should satisfy the following copolymer property requirements (1) to (4).

(i) Copolymer property requirements (1) The melt flow rate (MFR) should be 1.0 to 20.0 g/10 min, preferably 1.0 to 10.0 g/10 min.

When the melt flow rate is below the lower limit of the above range, the extrudability of the propylene resin composition is unsatisfactory. On the other hand, when the melt flow rate exceeds the above range, the impact strength of the film is markedly lowered.

(2) The melting peak temperature should be 130 to 150° C., preferably 130 to 145 ° C., as determined with a differential scanning calorimeter (DSC).

In the case of the propylene-α-olefin random copolymer composed mainly of propylene, the melting peak temperature varies depending upon the regularity of the propylene segment, the kind of the comonomer, the method for introducing the comonomer, and the content of the comonomer. For example, for a copolymer of propylene with ethylene which has been produced in the presence of a carrier-supported catalyst, an ethylene content of generally about 2.9 to 8.7% by mole, preferably about 4.4 to 8.7% by mole, provides a melting peak temperature falling within the above range, although this varies depending upon the method for introducing ethylene.

When the melting peak temperature as determined with DSC is below the lower limit of the above range, the blocking resistance and the scratch resistance are unsatisfactory. On the other hand, when the melting peak temperature exceeds the upper limit of the above range, separation of the anti-blocking agent occurs, or otherwise the impact resistance is unsatisfactory.

(3) The extraction as measured at 40° C. using o-dichlorobenzene as a solvent should be not more than 4.0% by weight, preferably not more than 2.0% by weight.

The production process of the copolymer is not particularly limited so far as the amount of the fraction falls within the above range. Examples of production processes usable herein include one wherein a catalyst system comprising a carrier-supported catalyst component and an electron donating compound is used and one wherein a polymer produced in the presence of a catalyst consisting of titanium trichloride or a catalyst composed mainly of titanium trichloride is washed.

When the extraction as measured at 40° C. using o-dichlorobenzene as a solvent exceeds the upper limit of the above range, the transparency, glass, and scratch resistance after shrinking are unsatisfactory.

The extraction using o-dichlorobenzene may be determined by temperature rising elution fractionation (TREF).

Measurement of TREF

The measurement of TREF may be carried out by using a method and an apparatus described in Journal of Applied Polymer Science, Vol. 26, 4217–4231 (1981).

(4) The ratio of the weight average molecular weight to the number average molecular weight (molecular weight distribution) should be 1.5 to 7.0, preferably 2.0 to 6.0, as determined by gel permeation chromatography (GPC).

When the molecular weight distribution is below the lower limit of the above range, the extrudability is unsatisfactory, while when the molecular weight distribution exceeds the upper limit of the above range, the transparency of the film is unsatisfactory.

(a) Kind

Examples of propylene-α-olefin random copolymers composed mainly of propylene include, for example, bipolymers of propylene as a main component and other 1-alkenes (for example, ethylene, 1-butene, 1-pentene, 1-hexene, and 4-methylpentene-1) as a minor component and terpolymers of propylene as a main component, ethylene as a first minor component, and other 1-alkenes (for example, 1-butene, 1-pentene, 1-hexene, and 4-methylpentene-1) as a second minor component.

(b) Production

The propylene-α-olefin random copolymers composed mainly of propylene may be produced by applying a conventional production process.

Catalyst

The catalyst used in the production of the propylene-α-olefin random copolymers composed mainly of propylene is not particularly limited. For example, metallocene catalysts called "Kaminsky catalyst" may be used. Another specific example of the catalyst usable herein is a catalyst system comprising a titanium-containing solid catalyst component and a cocatalyst component of an organoaluminum compound. The titanium-containing solid catalyst component may be selected from conventional carrier-supported catalyst components obtained by bringing solid magnesium compounds, tetrahalogenated titanium, and electron donating compounds into contact with one another, titanium trichloride, and conventional catalyst components composed mainly of titanium trichloride. Catalyst systems comprising conventional electron donating compounds as a third component in addition to the solid catalyst component and the cocatalyst component may also be used.

Polymerization

The polymerization may be carried out by any method so far as the catalyst component can be efficiently contacted with each monomer. Specific examples of polymerization methods usable herein include a slurry polymerization method using an inert solvent, a bulk polymerization method wherein propylene is used as a solvent without substantial use of an inert solvent, a solution polymerization method, and gaseous phase polymerization wherein polymerization is carried out without substantial use of a liquid solvent while substantially maintaining each monomer in a gaseous state. The polymerization may be carried out continuously or batch-wise. In the case of the slurry polymerization, polymerization solvents usable herein include saturated aliphatic or aromatic hydrocarbons, such as hexane, heptane, pentane, cyclohexane, benzene, and toluene. They may be used alone or as a mixture of two or more.

(B) Nucleating agent

The kind and amount of the nucleating agent to be used in the propylene resin composition of the present invention is not particularly limited so far as use of the selected nucleating can satisfy the following requirements [I] and [II]. Specific examples of nucleating agents usable herein include: organic nucleating agents, such as 3-methyl butene-1, aluminum hydroxy-di-p-t-butylbenzoate, dibenzylidene sorbitol, dimethylbenzylidene sorbitol, bis(2,4,8,10-tetra-t-butyl-6-hydroxy-12H-dibenzo[d,g][1,3,2]dioxaphosphosin-6-oxide) aluminum hydroxide salt, and sodium 2,2-methylenebis(4,6-di-t-butylphenyl) phosphate; and inorganic nucleating agents, such as talc.

Among them, sodium 2,2-methylenebis(4,6-di-t-butylphenyl) phosphate is particularly preferred because addition of the compound in a small amount can offer significant effect.

The isothermal crystallization time [B] of the propylene-α-olefin random copolymer composed mainly of propylene upon addition of the nucleating agent to the copolymer as measured at 115° C. with DSC should satisfy the following requirements [I] and [II];

$50 \leq [A]-[B] \leq 500$   [I]

$[B] \leq 100$   [II]

wherein [A] represents the isothermal crystallization time (sec) at 115° C. of the propylene-α-olefin random copolymer with the nucleating agent not added thereto as measured with DSC; and [B] represents the isothermal crystallization time (sec) at 115° C. of the propylene-α-olefin random copolymer with the nucleating agent added thereto as measured with DSC.

When the value of ([A]–[B]) is below the lower limit of the range represented by the formula [I], the moldability and the scratch resistance are unsatisfactory. On the other hand, the value exceeds the upper limit of the above range, the pinhole resistance is unsatisfactory. When [B] exceeds the upper limit of the above range represented by the formula [II], the scratch resistance and the pinhole resistance are unsatisfactory.

Measurement of Isothermal (115° C.) Crystallization Time with Differential Scanning Calorimeter (DSC)

5.0 mg of a sample is weighed in DSC manufactured by Seiko, held at 200° C. for 5 min, cooled to 115° C. at a temperature fall rate of 40° C./min, and then held. The crystallization peak time (unit: sec) after holding is measured.

(C) Spherical particles of magnesium silicate

The spherical particles of magnesium silicate to be used in the propylene resin composition of the present invention should have an average particle diameter of 0.5 to 7.0 μm and a sphericity of not less than 0.7. The magnesium silicate may be represented by compositional formula $(SiO_2)_x \cdot (MgO) \cdot (Na_2O)_z \cdot (H_2O)_n$ wherein $x+y+z+n=100\%$ by weight.

The magnesium silicate may be prepared by reacting silicon dioxide ($SiO_2$), prepared by the gel process, with magnesium hydroxide ($Mg(OH)_2$). Commercially available products of the magnesium silicate may also be used.

(a) Average particle diameter

The average particle diameter should be 0.5 to 7.0 μm, preferably 1.0 to 5.0 μm.

When the average particle diameter exceeds the upper limit of the above range, the transparency of the film is likely to be deteriorated. On the other hand, when the average particle diameter is below the lower limit of the above range, the slipperiness and blocking resistance of the film at the time of winding are likely to be deteriorated.

Measurement of Average Particle Diameter

The average diameter of spherical particles constituting the fine powder of magnesium silicate to be used in the present invention may be measured by Coulter counting.

(b) Sphericity (f)

The spherical particles of magnesium silicate to be used in the present invention should have a sphericity (f) of not less than 0.7, preferably not less than 0.8, as calculated by the following equation.

$$f = \sqrt{A/(\pi/4)} \times /D\max$$

wherein A represents the sectional area of the particle, $mm^2$; and Dmax represents the maximum length of the section of the particle, mm. The sphericity value given by this equation is 0 to 1, and, in the case of true spheres, the sphericity value is 1.

When the sphericity (f) is below the lower limit of the above range, the slipperiness of the film is unsatisfactory.

Measurement of Sphericity (f)

The sphericity (f) may be determined by measuring the sectional area ($mm^2$) of the particle and the maximum length (mm) of the section of the particle. Specifically, an epoxy resin is added to spherical fine particles of magnesium silicate, the epoxy resin is then solidified, the solidified epoxy resin with the spherical fine particles embedded therein is cut by means of a microtome, followed by measurement of the section of the fine particles by an image analyzer.

(2) Quantitative Ratio

The amount of spherical fine particles of magnesium silicate added should be 0.01 to 1.0 part by weight, preferably 0.05 to 0.6 part by weight, particularly preferably 0.1 to 0.4 part by weight, based on 100 parts by weight of the propylene-α-olefin random copolymer composed mainly of propylene.

When the amount of the spherical particles incorporated is below the lower limit of the above range, the effect of improving the slipperiness and the blocking resistance of the film is unsatisfactory. On the other hand, an amount exceeding the upper limit of the above range unfavorably leads to creation of fish eyes and deteriorated transparency.

[II] Production of Composition

The propylene resin composition of the present invention may be produced by any method so far as the nucleating agent and the spherical anti-blocking agent can be homogeneously dispersed and mixed into the propylene-α-olefin random copolymer composed mainly of propylene. A particularly preferred method is such that the powdery propylene-α-olefin random copolymer as the main component and various additives are weighed and intimately mixed together in the powder form by means of a ribbon blender, a Henschel mixer or the like to prepare a homogeneous powder dispersion which is then melt mixed and kneaded by means of a screw extruder, such as a single screw extruder or a twin screw extruder, followed by cooling and cutting to prepare a pelletized mixture.

A method may also be used which comprises compounding the propylene-α-olefin random copolymer, the nucleating agent, and the spherical anti-blocking agent, pelletizing the compound to prepare pellets as a master batch containing the nucleating agent and the anti-blocking agent in high concentrations, and, at the time of the production of a film, mixing the master batch with pellets containing neither the nucleating agent nor the anti-blocking agent so as to provide a composition falling within the scope of the present invention which is then formed into a film.

Additives and the Like

The propylene resin composition of the present invention may optionally contain conventional additives, such as antioxidants, slip agents, neutralizing agents, antistatic agents, weatherproof agents, antifogging agents, pigments, fillers and the like.

[III] Stretched Film (1) Production of Stretched Film

The stretched film of the present invention may be produced using the propylene resin composition as a raw resin in the same manner as used in the production of conventional stretched films.

Specifically, the stretch film may be obtained by at least monoaxially stretching the film according to methods commonly used in the production of stretched films on a commercial scale, for example, roll stretching, tenter stretching, tubular stretching, or stretching using a pantograph type bench stretching machine. In the case of biaxial stretching, simultaneous stretching in two directions, sequential stretching or multistage stretching may be applied.

The stretch ratio in one direction is generally 2.0 to 12 times, preferably 3.0 to 10 times. The thickness of the film after stretching is generally 5 to 200 μm, preferably 8 to 100 μm.

(2) Post Treatment

After stretching, heat treatment is generally carried out with stretching or several percent relaxing. If necessary, after that, surface treatment, such as corona discharge treatment, may be carried out in air or in an inert gas.

The following examples and comparative examples further illustrate the present invention but are not intended to limit it.

Evaluation Methods

Films produced in the examples and the comparative examples were evaluated by the following methods.

(1) Melting Peak Temperature Determined with DSC 5.0 mg of a sample was weighed in DSC manufactured by Seiko, held at 200° C. for 5 min, and crystallized by cooling the heated sample to 40° C. at a temperature fall rate of 10° C./min. The sample was then melted at a temperature rise rate of 10° C./min to prepare a calorimetric curve from which the melting peak temperature (unit: ° C.) was determined.

(2) Isothermal (115° C.) Crystallization Time Determined with DSC 5.0 mg of a sample was weighed in DSC manufactured by Seiko, held at 200° C. for 5 min, and cooled to 115° C. at a temperature fall rate of 40° C./min. The sample was then held, and the crystallization peak time (unit: sec) after holding was measured.

(3) TREF Extraction at 40° C.

Apparatus: model CFC T150A, manufactured by Mitsubishi Chemical Corporation

Column: AD80M/S manufactured by Showa Denko K. K. (3 columns)

Concentration: 40 mg/10 ml

Solvent: o-dichlorobenzene (4) Ratio of Weight Average Molecular Weight to Number Average Molecular Weight (Molecular Weight Distribution)

Apparatus: model GPC 150C manufactured by Waters

Column: AD80M/S manufactured by Showa Denko K. K. (three columns)

Temperature: 140° C.

Concentration: 20 mg/10 ml

Solvent: o-dichlorobenzene (5) Melt Flow Rate (MFR)

The melt flow rate (unit: g/10 min) was measured according to JIS K 6758 (Testing Methods for Polypropylene, Melt Flow Rate, conditions: 230° C. and load 2.16 kgf)

(6) Heat Shrinkage

A film specimen having a size of 5 cm square was immersed in a glycerin bath having a predetermined temperature for 10 sec, and the shrinkage of the film specimen in the machine direction (MD) and the transverse direction (TD) was then measured.

Shrinkage (%)=((dimension before heating−dimension after heating)/dimension before heating)×100

The shrinkage was evaluated as good when it was not less than 8% at 80° C., not less than 15% at 100° C., and not less than 40% at 120° C.

(7) Haze

The haze of the film was measured with a haze meter according to ASTM D 1003.

The lower the haze value, the better the transparency. The haze was evaluated as good when the measured value was not more than 4.0%.

(8) Gloss

The gloss of the film was measured with a gloss meter according to JIS Z 8741.

The higher the measured value of the gloss, the better the gloss. The gloss was evaluated as good when the measured value of the gloss was not less than 120%.

(9) Transparency (Haze) and Gloss After Shrinking

A commercially available cased video tape (100 mm in width×200 mm in length×25 mm in thickness) was sandwiched between two films. The films surrounding the case were subjected to melt cutting and sealing at 230° C. to prepare a bag with the cased video tape housed therein. The bag was rectangular in shape and 15% larger in longitudinal and lateral directions than the size of the case. The bag with the cased video tape housed therein was passed through a shrink tunnel under conditions of internal temperature of tunnel 160° C. and heating time (passage time) 10 sec to shrink the film constituting the bag, whereby the film was brought into intimate contact with the case. The haze and gloss of this film were then measured.

The haze was evaluated as good when the haze after shrinking was not more than 4.0% with the difference in haze between before shrinking and after shrinking being not more than 0.5%.

The gloss was evaluated as good when the gloss after shrinking was not less than 120% with the difference in gloss between before shrinking and after shrinking being not more than 10%.

(10) Blocking Resistance

A sample film having a size of 2 cm in width×15 cm in length was folded so that the same face was overlapped by a length of 5 cm. The film was then conditioned under a load of 100 g/cm$^2$ in an atmosphere of 40° C. for 24 hr. Thereafter, the load was removed, and the film was then satisfactorily conditioned at a temperature of 23° C. Thereafter, the force (unit: g/10 cm$^2$) necessary for creating shear peeling of the sample was measured using a tensile tester at a rate of 200 mm/min.

The smaller the measured value, the better the blocking resistance. The blocking resistance was evaluated as good when the measured value of the force was less than 1,000 g/10 cm$^2$.

(11) Hot Slipping (Sliding Coefficient of Friction)

The static coefficient of friction was measured in a thermostatic chamber having an atmosphere temperature of 50° C., 55° C., or 60° C. and a relative humidity RH of 65% according to ASTM D 1894-63.

The hot slipping was evaluated as good when the static coefficient of friction was not more than 0.4 at 50° C., not more than 0.6 at 55° C., and not more than 1.0 at 60° C.

(12) Pinhole Resistance at the Time of Heat Sealing

The procedure as described above in connection with the item (9) (transparency (haze) after shrinking) was repeated to prepare a bag with a cased video tape housed therein and to shrink the film constituting the bag. This shrink test was carried out for 20 samples of each film.

The film sample was regarded as a reject when 2 or more holes having a size of not less than 2 mm or 3 or more holes having a size of less than 2 mm were created at the sealed portion of the film package after shrinking. The pinhole resistance was evaluated according to the following criteria.

○ (good): A proportion of the number of acceptable test samples to the total number of test samples of not less than 80%

Δ (fair): A proportion of the number of acceptable test samples to the total number of test samples of 60 to less than 80%

X (unacceptable): A proportion of the number of acceptable test samples to the total number of test samples of less than 80%

(13) Separation of Anti-blocking Agent

The pelletized resin composition was melt extruded through an extruder at a resin temperature of 240° C. and rapidly cooled by a cooling roll at 40° C. to form a 0.8 mm-thick sheet. The sheet was then stretched by means of a tenter type successive biaxial stretching machine by a factor of four in the longitudinal direction and subsequently by a factor of ten in the lateral direction. The stretched film having a thickness of 20 μm was wound up on a paper tube at a take up rate of 50 m/min for 10 min. In this case, before a position where the film was wound up on the paper tube, a felt was wound around and fixed to a roll so that the film was rubbed with the felt under a given pressure to visually inspect the film for the occurrence of powder (separation of the anti-blocking agent).

(14) Scratch Resistance

A film sample (60 mm in width×500 mm in length) was fixed onto a felt layer of a measuring table comprising a felt laminated on a flat plate. Another film (contact area: 60 mm in width×60 mm in length) was put on the film sample under a load of 3.2 kg and slid three times in one direction.

The film sample fixed onto the felt was then visually inspected for scratches. The results were evaluated according to the following criteria.

○ (good): No scratch

X (unacceptable): Noticeable stripe-shaped scratches

EXAMPLE 1

[Production of Compositions]

A propylene-ethylene random copolymer not containing a nucleating agent was provided which had a melt flow rate (MFR) of 2.3 g/10 min, an ethylene content of 5.8% by mole, a melting peak temperature of 140.5° C. as determined by DSC, a TREF extraction of 0.6% by weight as measured at 40° C. using o-dichlorobenzene as a solvent, a ratio of the weight average molecular weight to the number average molecular weight of 5.0 as determined by GPC, and an isothermal crystallization time at 115° C. of 217 sec as determined by DSC. To 100 parts by weight of the propylene-ethylene random copolymer were added 0.05 part by weight of tetrakis[methylene-3-(3',5'-di-t-butyl-4-hydroxyphenyl) propionate]methane and 0.05 part by weight of tris-(2,4-di-t-butylphenyl) phosphite as stabilizers, 0.1 part by weight of calcium stearate as a neutralizing agent, 0.25 part by weight of magnesium silicate having an average particle diameter of 2.0 μm, a sphericity (f) of 0.90 as an anti-blocking agent, and 0.05 part by weight of oleic amide and 0.05 part by weight of erucic amide as lubricants. Into the mixture was incorporated sodium 2,2,-methylenebis (4,6-di-t-butylphenyl) phosphate as a nucleating agent in such a suitable amount as will bring the isothermal crystallization time at 115° C. of the propylene-ethylene random copolymer to 15 sec as determined by DSC, followed by high speed mixing in a Henschel mixer at room temperature for one min. The mixture was then melt mixed and kneaded at 230° C. by means of a 50-mm φ extruder, followed by cooling and cutting to obtain a pelletized propylene resin composition.

[Production of Stretched Films]

This resin composition was pressed to obtain a 300 μm-thick sheet. A sheet sample having a size of 90 mm square was extracted from the sheet and biaxially stretched under the following conditions to obtain a biaxially stretched film.

Stretching machine: bench biaxial stretching machine, manufactured by Toyo Seiki Seisaku Sho, Ltd.
Temp.: 140° C.
Preheat time: 2 min
Stretch ratio: 4.5 times in MD and 4.5 times in TD
Stretch rate: 10 m/min Thus, an about 15 μm-thick film was obtained. The film was evaluated in the same manner as described above. The results are shown in Table 1.

EXAMPLE 2

The procedure of Example 1 was repeated, except that the amount of the anti-blocking agent added was changed to 0.15 part by weight. The film thus obtained was evaluated in the same manner as described above. The results are shown in Table 1.

EXAMPLE 3

The procedure of Example 1 was repeated, except that the amount of the anti-blocking agent added was changed to 0.50 part by weight. The film thus obtained was evaluated in the same manner as described above. The results are shown in Table 1.

EXAMPLE 4

The procedure of Example 1 was repeated, except that the propylene-ethylene random copolymer not containing a nucleating agent was one which had a melt flow rate (MFR) of 2.3 g/10 min, an ethylene content of 7.5% by mole, a melting peak temperature of 133.0° C. as determined by DSC, a TREF extraction of 1.5% by weight as measured at 40° C. using o-dichlorobenzene as a solvent, a ratio of the weight average molecular weight to the number average molecular weight of 5.6 as determined by GPC, and an isothermal crystallization time at 115° C. of 484 sec as determined by DSC. The film thus obtained was evaluated in the same manner as described above. The results are shown in Table 1.

EXAMPLE 5

The procedure of Example 1 was repeated, except that the propylene-ethylene random copolymer not containing a nucleating agent was one which had a melt flow rate (MFR) of 2.3 g/10 min, an ethylene content of 4.4% by mole, a melting peak temperature of 145.0° C. as determined by DSC, a TREF extraction of 0.5% by weight as measured at 40° C. using o-dichlorobenzene as a solvent, a ratio of the weight average molecular weight to the number average molecular weight of 4.9 as determined by GPC, and an isothermal crystallization time at 115° C. of 187 sec as determined by DSC. The film thus obtained was evaluated in the same manner as described above. The results are shown in Table 1.

Comparative Example 1

The procedure of Example 1 was repeated, except that the sphericity (f) of the anti-blocking agent was changed to 0.55. The film thus obtained was evaluated in the same manner as described above. The results are shown in Table 2.

Comparative Example 2

The procedure of Example 1 was repeated, except that the anti-blocking agent was not added. The film thus obtained was evaluated in the same manner as described above. The results are shown in Table 2.

Comparative Example 3

The procedure of Example 1 was repeated, except that the anti-blocking agent was changed from the magnesium silicate to amorphous silica. The film thus obtained was evaluated in the same manner as described above. The results are shown in Table 2.

Comparative Example 4

The procedure of Example 1 was repeated, except that the anti-blocking agent was changed from the magnesium silicate to polymethylsilsesquioxane having a sphericity (f) of 0.90. The film thus obtained was evaluated in the same manner as described above. The results are shown in Table 2.

Comparative Example 5

The procedure of Example 1 was repeated, except that the propylene-ethylene random copolymer not containing a nucleating agent was one which had a melt flow rate (MFR) of 2.3 g/10 min, an ethylene content of 9.5% by mole, a melting peak temperature of 126.0° C. as determined by DSC, a TREF extraction of 4.0% by weight as measured at 40° C. using o-dichlorobenzene as a solvent, a ratio of the weight average molecular weight to the number average molecular weight of 5.9 as determined by GPC, and an isothermal crystallization time at 115° C. of 575 sec as determined by DSC. The film thus obtained was evaluated in the same manner as described above. The results are shown in Table 2.

Comparative Example 6

The procedure of Example 1 was repeated, except that the propylene-ethylene random copolymer not containing a nucleating agent was one which had a melt flow rate (MFR) of 2.3 g/10 min, an ethylene content of 2.7% by mole, a melting peak temperature of 152.0° C. as determined by DSC, a TREF extraction of 0.5% by weight as measured at 40° C. using o-dichlorobenzene as a solvent, a ratio of the weight average molecular weight to the number average molecular weight of 4.9 as determined by GPC, and an isothermal crystallization time at 115° C. of 100 sec as determined by DSC. The film thus obtained was evaluated in the same manner as described above. The results are shown in Table 3.

Comparative Example 7

The procedure of Example 1 was repeated, except that the propylene-ethylene random copolymer not containing a nucleating agent was one which had a melt flow rate (MFR) of 2.3 g/10 min, an ethylene content of 5.8% by mole, a melting peak temperature of 140.5° C. as determined by DSC, a TREF extraction of 5.5% by weight as measured at 40° C. using o-dichlorobenzene as a solvent, a ratio of the weight average molecular weight to the number average molecular weight of 5.7 as determined by GPC, and an isothermal crystallization time at 115° C. of 297 sec as determined by DSC. The film thus obtained was evaluated in the same manner as described above. The results are shown in Table 3.

Comparative Example 8

The procedure of Example 1 was repeated, except that the propylene-ethylene random copolymer not containing a nucleating agent was one which had a melt flow rate (MFR) of 2.3 g/10 min, an ethylene content of 6.0% by mole, a melting peak temperature of 139.0° C. as determined by DSC, a TREF extraction of 3.9% by weight as measured at 40° C. using o-dichlorobenzene as a solvent, a ratio of the weight average molecular weight to the number average molecular weight of 7.2 as determined by GPC, and an isothermal crystallization time at 115° C. of 344 sec as determined by DSC. The film thus obtained was evaluated in the same manner as described above. The results are shown in Table 3.

Comparative Example 9

The procedure of Example 1 was repeated, except that 3-methyl butene-1 was incorporated as a nucleating agent in such a suitable amount as will bring the isothermal crystallization time at 115° C. of the propylene-ethylene random copolymer to 170 sec as determined by DSC. The film thus obtained was evaluated in the same manner as described above. The results are shown in Table 3.

Comparative Example 10

The procedure of Example 1 was repeated, except that no nucleating agent was added. The film thus obtained was evaluated in the same manner as described above. The results are shown in Table 3.

EXAMPLE 6

The procedure of Example 1 was repeated, except that the nucleating agent was changed from the sodium 2,2,- methylenebis(4,6-di-t-butylphenyl) phosphate to 3-methyl butene-1. The film thus obtained was evaluated in the same manner as described above. The results are shown in Table 4.

EXAMPLE 7

The procedure of Example 1 was repeated, except that the nucleating agent was changed from the sodium 2,2,-methylenebis(4,6-di-t-butylphenyl) phosphate to aluminum hydroxy-di-p-t-butyl benzoate. The film thus obtained was evaluated in the same manner as described above. The results are shown in Table 4.

EXAMPLE 8

The procedure of Example 1 was repeated, except that the nucleating agent was changed from the sodium 2,2,-methylenebis(4,6-di-t-butylphenyl) phosphate to dibenzylidene sorbitol. The film thus obtained was evaluated in the same manner as described above. The results are shown in Table 4.

EXAMPLE 9

The procedure of Example 1 was repeated, except that the nucleating agent was changed from the sodium 2,2,-methylenebis(4,6-di-t-butylphenyl) phosphate to dimethylbenzylidene sorbitol. The film thus obtained was evaluated in the same manner as described above. The results are shown in Table 4.

EXAMPLE 10

The procedure of Example 1 was repeated, except that the nucleating agent was changed from the sodium 2,2,-methylenebis(4,6-di-t-butylphenyl) phosphate to bis(2,4,8,10-tetra-t-butyl-6-hydroxy-12H-dibenzo[d,g][1,3,2]dioxaphosphosin-6-oxide) aluminum hydroxide salt. The film thus obtained was evaluated in the same manner as described above. The results are shown in Table 4.

TABLE 1

| | | Ex. 1 | Ex. 2 | Ex. 3 | Ex. 4 | Ex. 5 |
|---|---|---|---|---|---|---|
| MFR, g/10 min | | 2.3 | 2.3 | 2.3 | 2.3 | 2.3 |
| TREF extraction, wt % | | 0.6 | 0.6 | 0.6 | 1.5 | 0.5 |
| Molecular weight distribution | | 5.0 | 5.0 | 5.0 | 5.6 | 4.9 |
| DSC Melting peak temp., ° C. | | 140.5 | 140.5 | 140.5 | 133.0 | 145.0 |
| Crystallization time with nucleating agent not added (A), sec | | 217 | 217 | 217 | 484 | 187 |
| Crystallization time with nucleating agent added (B), sec | | 15 | 15 | 15 | 15 | 15 |
| (A) − (B) | | 202 | 202 | 202 | 469 | 172 |
| Anti-blocking agent | Type | Mg silicate | Mg silicate | Mg silicate | Mg silicate | Mg silicate |
| | Average particle diameter, µm | 2.0 | 2.0 | 2.0 | 2.0 | 2.0 |
| | Sphericity, f | 0.90 | 0.90 | 0.90 | 0.90 | 0.90 |
| | Amount added, wt % | 0.25 | 0.15 | 0.50 | 0.25 | 0.25 |
| Separation of anti-blocking agent | | ◯ | ◯ | ◯ | ◯ | ◯ |
| Scratch resistance | | ◯ | ◯ | ◯ | ◯ | ◯ |
| Heat shrinkage, % | 80° C. | 10 | 11 | 11 | 18 | 9 |
| (MD + TD) | 100° C. | 21 | 20 | 20 | 28 | 16 |
| | 120° C. | 45 | 46 | 46 | 52 | 41 |
| HAZE | Before shrinking | 2.8 | 1.9 | 4.0 | 2.5 | 3.2 |
| | After shrinking | 2.9 | 2.0 | 4.0 | 2.5 | 3.3 |
| GLOSS | Before shrinking | 131 | 138 | 121 | 134 | 129 |
| | After shrinking | 130 | 137 | 121 | 134 | 129 |
| Blocking properties, g/10 cm$^2$ | | 300 | 500 | 150 | 400 | 270 |
| Hot slip properties | 50° C. | 0.20 | 0.33 | 0.05 | 0.22 | 0.20 |
| | 55° C. | 0.37 | 0.47 | 0.15 | 0.38 | 0.33 |
| | 60° C. | 0.77 | 0.98 | 0.34 | 0.89 | 0.65 |
| Pinhole resistance at the time of melt cutting and sealing | | ◯ | ◯ | ◯ | ◯ | ◯ |

Note) Mg silicate: magnesium silicate

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| MFR, g/10 min | | 2.3 | 2.3 | 2.3 | 2.3 | 2.3 |
| TREF extraction, wt % | | 0.6 | 0.6 | 0.6 | 0.6 | 4.0 |
| Molecular weight distribution | | 5.0 | 5.0 | 5.0 | 5.0 | 5.9 |
| DSC Melting peak temp., ° C. | | 140.5 | 140.5 | 140.5 | 140.5 | 126.0 |
| Crystallization time with nucleating agent not added (A), sec | | 217 | 217 | 217 | 217 | 575 |
| Crystallization time with nucleating agent added (B), sec | | 15 | 15 | 15 | 15 | 35 |
| (A) − (B) | | 202 | 202 | 202 | 202 | 540 |
| Anti-blocking agent | Type | Mg silicate | — | Silicon dioxide | PMSO | Mg silicate |
| | Average particle diameter, μm | 2.0 | — | 2.0 | 2.0 | 2.0 |
| | Sphericity, f | 0.55 | — | — | 0.90 | 0.90 |
| | Amount added, wt % | 0.25 | — | 0.25 | 0.25 | 0.25 |
| Separation of anti-blocking agent | | ○ | — | ○ | x | ○ |
| Scratch resistance | | ○ | ○ | ○ | x | x |
| Heat shrinkage, % | 80° C. | 10 | 10 | 11 | 10 | 19 |
| (MD + TD) | 100° C. | 22 | 21 | 20 | 21 | 34 |
| | 120° C. | 46 | 46 | 45 | 47 | 56 |
| HAZE | Before shrinking | 3.3 | 1.0 | 5.0 | 3.3 | 2.8 |
| | After shrinking | 3.3 | 1.0 | 4.9 | 3.2 | 4.0 |
| GLOSS | Before shrinking | 127 | 150 | 117 | 129 | 133 |
| | After shrinking | 127 | 150 | 117 | 129 | 119 |
| Blocking properties, g/10 cm$^2$ | | 400 | 1,500 | 200 | 500 | 1,300 |
| Hot slip properties | 50° C. | 0.51 | >2.5 | 0.62 | 0.22 | 1.02 |
| | 55° C. | 0.98 | >2.5 | 1.15 | 0.34 | >2.5 |
| | 60° C. | >2.5 | >2.5 | >2.5 | 0.60 | >2.5 |
| Pinhole resistance at the time of melt cutting and sealing | | ○ | ○ | ○ | ○ | x |

Note)
Mg silicate: magnesium silicate
Silicon dioxide: amorphous silicon dioxide
PMSO: polymethylsylsesquioxane particles

TABLE 3

|  |  | Comp. Ex. 6 | Comp. Ex. 7 | Comp. Ex. 8 | Comp. Ex. 9 | Comp. Ex. 10 |
|---|---|---|---|---|---|---|
| MFR, g/10 min | | 2.3 | 2.3 | 2.3 | 2.3 | 2.3 |
| TREF extraction, wt % | | 0.5 | 5.5 | 3.9 | 0.6 | 0.6 |
| Molecular weight distribution | | 4.9 | 5.7 | 7.2 | 5.0 | 5.0 |
| DSC Melting peak temp., ° C. | | 152.0 | 140.5 | 139.0 | 140.5 | 140.5 |
| Crystallization time with nucleating agent not added (A), sec | | 100 | 297 | 344 | 217 | 297 |
| Crystallization time with nucleating agent added (B), sec | | 15 | 15 | 15 | 170 | Not added |
| (A) − (B) | | 85 | 282 | 329 | 47 | — |
| Anti-blocking agent | Type | Mg silicate | Mg silicate | Mg silicate | Mg silicate | Mg silicate |
| | Average particle diameter, μm | 2.0 | 2.0 | 2.0 | 2.0 | 2.0 |
| | Sphericity, f | 0.90 | 0.90 | 0.90 | 0.90 | 0.90 |
| | Amount added, wt % | 0.25 | 0.25 | 0.25 | 0.25 | 0.25 |
| Separation of anti-blocking agent | | x | ○ | ○ | ○ | ○ |
| Scratch resistance | | ○ | x | ○ | x | x |
| Heat shrinkage, % | 80° C. | 7 | 11 | 12 | 12 | 12 |
| (MD + TD) | 100° C. | 13 | 21 | 24 | 21 | 22 |
| | 120° C. | 37 | 45 | 47 | 45 | 46 |
| HAZE | Before shrinking | 3.8 | 3.0 | 5.2 | 3.3 | 3.2 |
| | After shrinking | 3.9 | 4.2 | 5.5 | 3.7 | 4.2 |
| GLOSS | Before shrinking | 120 | 131 | 114 | 129 | 129 |
| | After shrinking | 120 | 119 | 112 | 120 | 117 |
| Blocking properties, g/10 cm$^2$ | | 200 | 350 | 250 | 400 | 400 |
| Hot slip properties | 50° C. | 0.19 | 0.21 | 0.21 | 0.23 | 0.20 |
| | 55° C. | 0.35 | 0.59 | 0.40 | 0.50 | 0.41 |
| | 60° C. | 0.65 | 0.92 | 0.78 | 0.95 | 0.90 |
| Pinhole resistance at the time of melt cutting and sealing | | ○ | Δ | ○ | x | x |

Note) Mg silicate: magnesium silicate

TABLE 4

|  |  | Ex. 6 | Ex. 7 | Ex. 8 | Ex. 9 | Ex. 10 |
|---|---|---|---|---|---|---|
| MFR, g/10 min | | 2.3 | 2.3 | 2.3 | 2.3 | 2.3 |
| TREF extraction, wt % | | 0.6 | 0.6 | 0.6 | 0.6 | 0.6 |
| Molecular weight distribution | | 5.0 | 5.0 | 5.0 | 5.0 | 5.0 |
| DSC | Melting peak temp., °C. | 140.5 | 140.5 | 140.5 | 140.5 | 140.5 |
| | Crystallization time with nucleating agent not added (A), sec | 217 | 217 | 217 | 217 | 217 |
| | Crystallization time with nucleating agent added (B), sec | 15 | 15 | 15 | 15 | 15 |
| | (A) − (B) | 202 | 202 | 202 | 202 | 202 |
| Anti-blocking agent | Type | Mg silicate | Mg silicate | Mg silicate | Mg silicate | Mg silicate |
| | Average particle diameter, μm | 2.0 | 2.0 | 2.0 | 2.0 | 2.0 |
| | Sphericity, f | 0.90 | 0.90 | 0.90 | 0.90 | 0.90 |
| | Amount added, wt % | 0.25 | 0.25 | 0.25 | 0.25 | 0.25 |
| Separation of anti-blocking agent | | ○ | ○ | ○ | ○ | ○ |
| Scratch resistance | | ○ | ○ | ○ | ○ | ○ |
| Heat shrinkage, % | 80° C. | 10 | 11 | 11 | 10 | 12 |
| (MD + TD) | 100° C. | 20 | 22 | 21 | 20 | 22 |
| | 120° C. | 45 | 46 | 46 | 46 | 45 |
| HAZE | Before shrinking | 2.9 | 2.9 | 2.9 | 2.8 | 2.8 |
| | After shrinking | 3.0 | 3.0 | 3.0 | 3.0 | 2.9 |
| GLOSS | Before shrinking | 130 | 130 | 129 | 131 | 130 |
| | After shrinking | 129 | 129 | 129 | 130 | 129 |
| Blocking properties, g/10 cm$^2$ | | 280 | 300 | 300 | 300 | 270 |
| Hot slip properties | 50° C. | 0.20 | 0.20 | 0.19 | 0.21 | 0.21 |
| | 55° C. | 0.35 | 0.36 | 0.37 | 0.35 | 0.37 |
| | 60° C. | 0.78 | 0.78 | 0.79 | 0.77 | 0.76 |
| Pinhole resistance at the time of melt cutting and sealing | | ○ | ○ | ○ | ○ | ○ |

Note) Mg silicate: magnesium silicate

What is claimed is:

1. A propylene resin composition comprising: a propylene-α-olefin random copolymer composed mainly of propylene, the propylene-α-olefin random copolymer satisfying the following copolymer property requirements (1) to (4); a nucleating agent which, when added to the propylene-α-olefin random copolymer, can bring the isothermal crystallization time [B] at 115° C. of the copolymer to a value satisfying the following requirements [I] and [II]; and 0.01 to 1 parts by weight, based on 100 parts by weight of the propylene-α-olefin random copolymer, of spherical magnesium silicate particles having an average particle diameter of 0.5 to 7.0 μm and a sphericity (f) of not less than 0.7:
(i) copolymer property requirements
   (1) the melt flow rate of 1.0 to 20.0 g/10 min,
   (2) the melting peak temperature of 130 to 150° C. as determined with a differential scanning calorimeter (DSC),
   (3) the extraction of not more than 4.0% by weight as extracted at 40° C. using o-dichlorobenzene as a solvent, and
   (4) the ratio of the weight average molecular weight to the number average molecular weight of 1.5 to 7.0 as determined by gel permeation chromatography (GPC); and
(ii) isothermal crystallization time at 115° C.

$$50 \leq [A]-[B] \leq 500 \quad [I]$$

$$[B] \leq 100 \quad [II]$$

wherein [A] represents the isothermal crystallization time (sec) at 115° C. of the propylene-α-olefin random copolymer with the nucleating agent not added thereto as measured with DSC; and [B] represents the isothermal crystallization time (sec) at 115° C. of the propylene-α-olefin random copolymer with the nucleating agent added thereto as measured with DSC.

2. The propylene resin composition according to claim 1, wherein the nucleating agent is at least one member selected from the group consisting of 3-methyl butene-1, aluminum hydroxy-di-p-t-butyl benzoate, dibenzylidene sorbitol, dimethylbenzylidene sorbitol, bis(2,4,8,10-tetra-t-butyl-6-hydroxy-12H-dibenzo[d,g][1,3,2]dioxaphosphosin-6-oxide) aluminum hydroxide salt, and sodium 2,2-methylenebis(4, 6-di-t-butylphenyl) phosphate.

3. The propylene resin composition according to claim 2, wherein the nucleating agent is sodium 2,2-methylenebis(4, 6-di-t-butylphenyl) phosphate.

4. A stretched film produced by forming a propylene resin composition into a sheet or a film and at least monoaxially stretching the sheet or film, the propylene resin composition comprising: a propylene-α-olefin random copolymer composed mainly of propylene, the propylene-α-olefin random copolymer satisfying the following copolymer property requirements (1) to (4); a nucleating agent which, when added to the propylene-α-olefin random copolymer, can bring the isothermal crystallization time [B] at 115° C. of the copolymer to a value satisfying the following requirements [I] and [II]; and 0.01 to 1 parts by weight, based on 100 parts by weight of the propylene-α-olefin random copolymer, of spherical magnesium silicate particles having an average particle diameter of 0.5 to 7.0 μm and a sphericity (f) of not less than 0.7:
(i) copolymer property requirements
   (1) the melt flow rate of 1.0 to 20.0 g/10 min,
   (2) the melting peak temperature of 130 to 150° C. as determined with a differential scanning calorimeter (DSC),
   (3) the extraction of not more than 4.0% by weight as measured at 40° C. using o-dichlorobenzene as a solvent, and
   (4) the ratio of the weight average molecular weight to the number average molecular weight of 1.5 to 7.0 as determined by gel permeation chromatography (GPC); and
(ii) isothermal crystallization time at 115° C.

$$50 \leq [A]-[B] \leq 500 \quad [I]$$

$$[B] \leq 100 \quad [\text{II}]$$

wherein [A] represents the isothermal crystallization time (sec) at 115° C. of the propylene-α-olefin random copolymer with the nucleating agent not added thereto as measured with DSC; and [B] represents the isothermal crystallization time (sec) at 115° C. of the propylene-α-olefin random copolymer with the nucleating agent added thereto as measured with DSC.

5. The stretched film according to claim 4, wherein the nucleating agent is at least one member selected from the group consisting of 3-methyl butene-1, aluminum hydroxy-di-p-t-butyl benzoate, dibenzylidene sorbitol, dimethylbenzylidene sorbitol, bis(2,4,8,10-tetra-t-butyl-6-hydroxy-12H-dibenzo[d,g][1,3,2]dioxaphosphosin-6-oxide) aluminum hydroxide salt, and sodium 2,2-methylenebis(4,6-di-t-butylphenyl) phosphate.

6. The stretched film according to claim 5, wherein the nucleating agent is sodium 2,2-methylenebis(4,6-di-t-butylphenyl) phosphate.

* * * * *